US006948034B2

United States Patent
Aoki

(10) Patent No.: US 6,948,034 B2
(45) Date of Patent: Sep. 20, 2005

(54) METHOD FOR USE OF STACK

(75) Inventor: Yayoi Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 209 days.

(21) Appl. No.: 10/300,788

(22) Filed: Nov. 21, 2002

(65) Prior Publication Data
US 2003/0105927 A1 Jun. 5, 2003

(30) Foreign Application Priority Data

Nov. 30, 2001 (JP) ........................................ 2001-366399

(51) Int. Cl.[7] ............................................. G06F 12/00
(52) U.S. Cl. ..................... 711/132; 711/129; 718/100
(58) Field of Search ................................ 711/129, 132; 718/100

(56) References Cited

U.S. PATENT DOCUMENTS

| 5,727,178 A | * | 3/1998 | Pletcher et al. ............. 711/202 |
| 6,332,215 B1 | * | 12/2001 | Patel et al. ................. 717/141 |
| 2001/0037425 A1 | | 11/2001 | Yanagi |
| 2002/0019976 A1 | * | 2/2002 | Patel et al. ................. 717/137 |

FOREIGN PATENT DOCUMENTS

| JP | 1-251248 | 10/1989 |
| JP | 02-178847 | 7/1990 |
| JP | 4-219842 | 8/1992 |
| JP | 7-056755 | 3/1995 |
| WO | WO 00/038060 A2 | 6/2000 |
| WO | WO 01/084304 A2 | 11/2001 |

OTHER PUBLICATIONS

The English translation of the Applicant's Admitted Prior Art: A Study of JAVA Virtual Machine Multithread Academic Journal of Yunan University (Natural Science Section) 1997; pp. 531–538.*

A Study of JAVA Virtual Machine Multithread Academic Journal of Yunan University (Natural Science Section) 1997, pp. 531–538.

Shinji Nakagawa et al., "Development of a Realtime Java TM Bytecode", Omron Technics, vol. 40, No. 1, pp. 38–43, Mar. 20, 2000.

Takashi Aoki, "A Java Virtual Machine on a Real Hardware Stack Machine", The Institute of Electronic, Information and Communication Engineers, vol. 100, No. 655, pp. 39–46, Feb. 27, 2001.

* cited by examiner

Primary Examiner—Matthew D. Anderson
Assistant Examiner—Hetul Patel
(74) Attorney, Agent, or Firm—Foley & Lardner LLP

(57) ABSTRACT

The present invention has an objective of minimizing deterioration of the processing speed of a Java accelerator device even when stack overflow occurs in a stack memory unit.

A first thread presently allocated to a first stack area of a stack memory unit 113 to which a fourth thread belongs is saved in a virtual stack area of a main storage medium 103. Thereafter, the data of the fourth thread as stack data to be switched is copied to the first stack area of the stack memory unit 113 by the controller unit 112 (accelerator device 101).

6 Claims, 3 Drawing Sheets

METHOD FOR USE OF STACK

FIELD OF THE INVENTION

The present invention relates to a method for use of a stack in a Java accelerator device. Here, "Java" is a trademark.

BACKGROUND OF THE INVENTION

Java is an object-oriented programming language developed based on C++ by Sun Microsystems (USA), which is characteristic in that it allows a created program to be executed without depending on specific operating systems (OS) or specific types of personal computers (PC). Although a source code of a program does not depend on specific OSs or specific types of PCs, it requires an interpreter called Java Virtual Machine (VM).

VM is a software provided with a function for executing an intermediate code called a byte code. VM is characteristic in that byte codes as an instruction set of VM are relatively compact. A Java chip in which the above-described VM is implemented with a hardware may be used so that internal devices such as a portable terminal can be developed which can execute a program of byte codes with small code sizes.

While Java has been receiving great attention, various attempts have been made to enhance the processing speed of Java. For example, use of a Java accelerator device that executes part of interpreter processing with a hardware is one technique to enhance the processing speed of Java. Such Java accelerator device is provided with a stack memory unit as an internal hardware that allows high-speed access, thereby enhancing stack access speed.

However, since a memory that allows high-speed access is expensive, a capacity of the above-described stack memory unit tends to be small, and thus is likely to result in stack overflow. Some methods use a predetermined area of a main storage medium (main memory) used in general VM as a stack area when such overflow occurs. However, this renders the use of the accelerator device meaningless.

SUMMARY OF THE INVENTION

Thus, in view of the above-described problem, the present invention has an objective of minimizing deterioration of the processing speed of the Java accelerator device even when stack overflow occurs in the stack memory unit.

A method for use of a stack according to present invention, the method comprising the steps of: instructing a Java accelerator device to switch a thread allocated to a stack memory unit included in the Java accelerator device, from a first thread to a second thread; and instructing the Java accelerator device to execute the switched second thread allocated to the stack memory unit.

According to this method for use of a stack, the second thread to be executed by the Java accelerator device is always present in the stack memory unit provided in the Java accelerator device.

Further, it is preferably the first thread after the switching is allocated to a predetermined area of a main storage medium, which is arranged external to the Java accelerator device. Moreover, the stack memory unit is equally partitioned into a plurality of stack frames to which the threads are allocated. Furthermore, a thread that cannot be allocated to the stack frame of the stack memory unit is allocated to a virtual stack frame formed in the main storage medium, which corresponds to the stack frame of the stack memory unit.

DETAILED DESCRIPTION OF THE INVENTION

Hereinafter, an embodiment of the present invention will be described with reference to the drawings.

Figure 1:
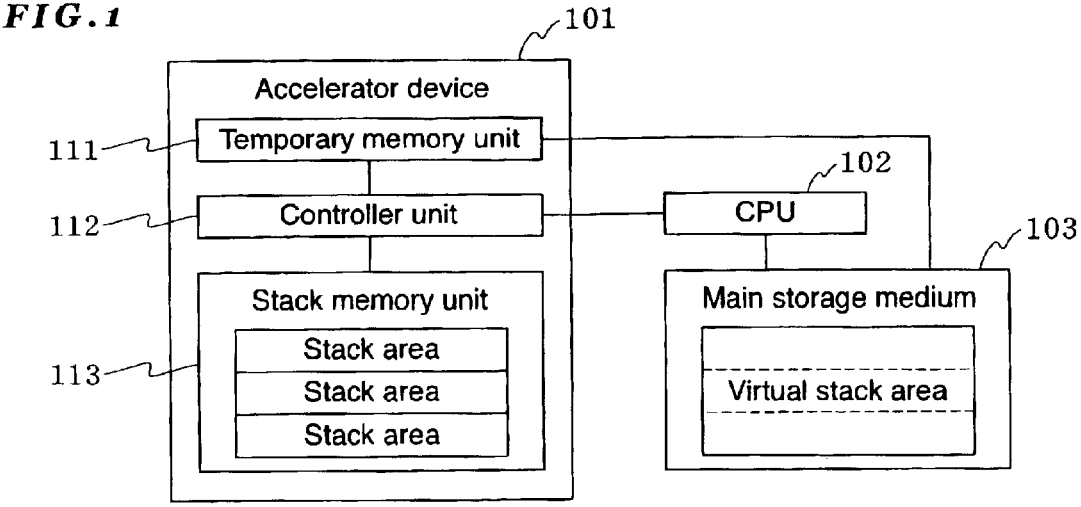
FIG. 1 is a block diagram showing an exemplary configuration of a Java accelerator device to which a method for use of a stack according to an embodiment of the invention is applied.

FIG. 1 is a block diagram showing an exemplary configuration of a Java accelerator device to which a method for use of a stack according to the present embodiment of the invention is applied. This type of accelerator device 101 is used by being connected to a computer provided with a CPU 102 and a main storage medium 103, and is provided with a temporary memory unit 111, a controller unit 112 and a stack memory unit 113.

The CPU 102 processes a software or controls the accelerator device 101 according to a program stored in the main storage medium 103. When a Java program is executed, a virtual stack area is provided in the main storage medium 103. In the accelerator device 101, the controller unit 112 executes interpreter processing as well as stack data copy processing with a hardware. The temporary memory unit 111 is used for the CPU 102 to control the accelerator device 101. In the stack memory unit 113 including a plurality of equally partitioned stack areas, data is written in and read out by the controller unit 112 and the CPU 102.

The controller unit 112 performs various processing according to instructions from the CPU 102. When the controller unit 112 receives an instruction "Start" from the CPU 102 to start processing, it performs, for example, byte code processing by the interpreter, stack operation in the stack memory unit 113 or, when a byte code that cannot be executed by the accelerator device 101 is fetched out, stops the accelerator device 101 (STOP) and notifies the CPU 102.

When the controller unit 112 receives an instruction "COPY", it exchanges data in a stack area of the stack memory unit 113 with data in a virtual stack area of the main storage medium 103, according to the address and size given from the CPU 102 to the temporary memory unit 111. This data exchanging processing is performed when thread are switched.

When the controller unit 112 receives an instruction "GROWUP", it saves data in the stack area of the stack memory unit 113 in the virtual stack area of the main storage medium 103, according to the address and size given from the CPU 102 to the temporary memory unit 111. When the controller unit 112 receives an instruction "CHANGE", it exchanges data in the stack area of the stack memory unit 113 and relocates the memory reference values in the stack areas, according to the two addresses given from the CPU 102 to the temporary memory unit 111.

According to the present embodiment, the accelerator device configured as described above uses the stack memory unit 113 as described below to execute Java VM.

First, when the CPU 102 enters an interpreter loop, it transmits the instruction "START" to the accelerator device 101, which, in turn, executes interpreter processing.

When the accelerator device 101 undergoing the interpreter processing meets a byte code that cannot be executed with a hardware, it transmits "STOP" notification to the CPU 102. Upon receiving this notification, the CPU 102 executes the above-described byte code processing and then transmits the instruction "START" to the accelerator device 101 again. Thus, any unexcitable byte code is processed by the CPU 102 so that the accelerator device 101 has to execute only specific byte code processing. Frame pushing and thread switching are executed by the CPU 102.

The stack memory unit 113 is equally partitioned into a plurality of areas (a single area is referred to as a "stack area"). One stack area as a stack frame is allocated one thread so that a plurality of threads can use the stack memory unit 113 at the same time.

When the number of the generated threads is equal to or less than the number of the equally partitioned stack areas of the stack memory unit 113, the threads can directly be allocated to the stack areas as the stack frames. When the number of the generated threads is higher than the number of the partitioned stack areas, the threads are allocated to virtual stack frames reserved in the virtual stack areas of the main storage medium 103.

When the number of generated threads is higher than the prepared stack areas, stack data in the stack area of the stack memory 113 and stack data in the virtual stack frame of the virtual stack area are repeatedly saved and restored upon every thread switching so that the stack data of the currently executed thread (called the "current thread") is always in the stack memory unit 113. This switching processing is performed with the hardware by transmitting an instruction "COPY" from the CPU 102 to the accelerator device 101.

When a thread is generated, a stack area to which the generated thread belongs is determined. These values are stored for respective threads. When a thread becomes the current thread, the data is always located in the same area (stack area) of the stack memory 113.

In order to effectively utilize the stack area, the number of the surviving threads upon thread deletion and the number of threads belonging to the stack area to which the deleted thread belonged are checked. If any unused stack area is found, threads are transferred starting from those belonging to a stack area with more number of threads. This stack area changing processing is performed with a hardware by transmitting the instruction "CHANGE" from the CPU 102 to the accelerator device 101.

The number of threads belonging to each stack area is known so that when a new thread is generated, it is allocated to a stack area with the least number of threads. For example, when a thread is saved in the virtual stack area for the first time upon thread switching, a virtual stack frame for a size of the stack area is reserved. Accordingly, in order to save stack data, a virtual stack frame fixedly corresponding to each stack area is allocated each thread that is to be saved in the virtual stack area of the main storage medium 103.

When a new stack needs to be reserved for a target thread to be executed (frame push), and when the size of the stack data used for this thread exceeds the size of the stack area, exceeding data is saved in the corresponding virtual stack area as described below. This is called the regrowth of the stack frame and is executed upon transmission of the instruction "GROWUP" from the CPU 102 to the accelerator device 101. When the controller unit 112 receives the instruction "GROWUP", it saves, in the virtual stack frame, the stack data of the thread that has been stored in the stack memory unit 113 and that has just been used. The remaining empty stack area is used as a area (regrowth area) for stack data of the above-described new thread.

Hereinafter, a method for allocating stack frames when the number of threads exceeds the number of partitioned areas of the stack memory unit 113 will be described with reference to FIGS. 2 to 4. First, when the number of the generated threads does not exceed the number of the partitioned areas of the stack memory unit 113, the generated threads are directly allocated to the stack areas of the stack memory unit 113.

Figure 2:
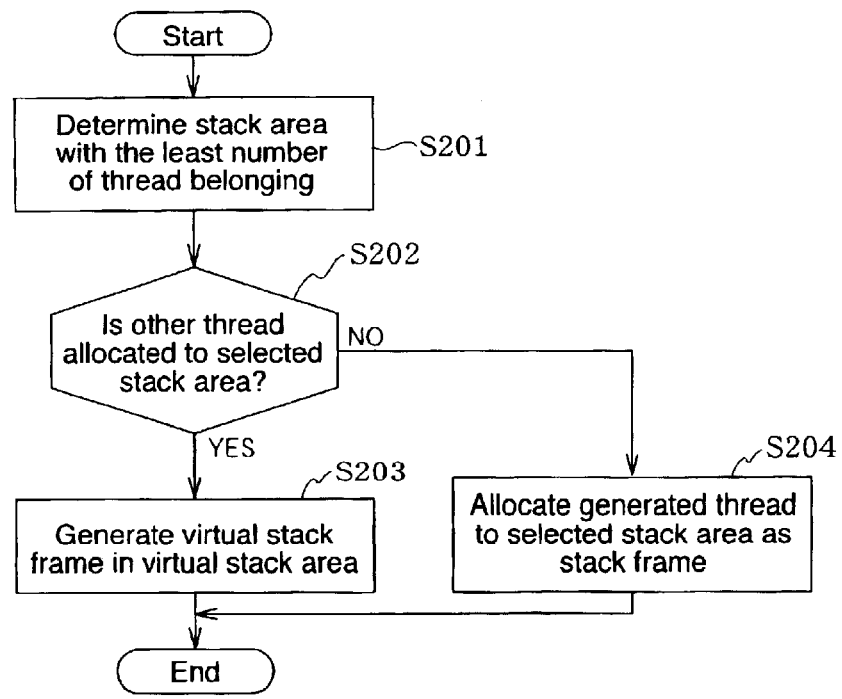
FIG. 2 is a flowchart showing one example of the method for use of a stack according to the embodiment of the invention.
Figure 3:
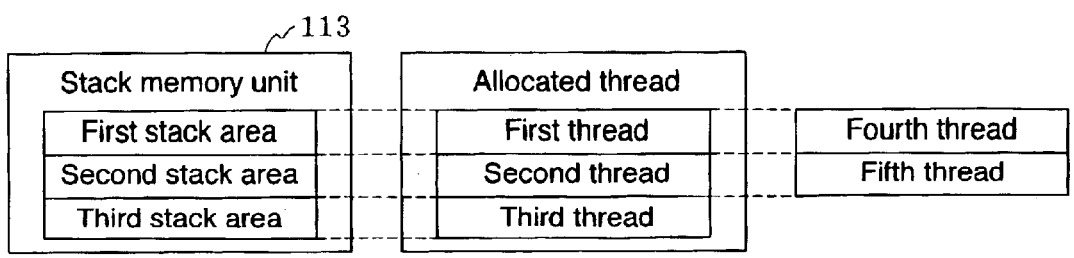
FIG. 3 is a diagram illustrating partitioning of a stack.

On the other hand, when the number of the generated threads exceeds the number of the partitioned areas of the stack memory unit 113, first, in Step S201 of the flowchart shown in FIG. 2, a stack area with the least number of threads is searched and the searched area is stored in the generated thread.

Next, a virtual stack frame is generated in the virtual stack area of the main storage medium 103. The address of the generated virtual stack frame is stored in the above-described generated thread. In addition, the number of threads to be stored in the stack area to which the generated thread belongs is counted. After determining the stack area for the generated thread to belong to (Step S201), when the thread is to be actually stored in the stack area, first, the corresponding stack area is selected, and then whether or not other thread is allocated to the selected stack area is checked (Step S202).

When there is other thread being allocated to the selected stack area, a virtual stack frame is generated (acquired) in the virtual stack area of the main storage medium 103 (Step S203). On the other hand, when there is no thread being allocated to the selected area (Step S202), the thread is allocated to the selected stack area as a stack frame (Step S204). FIG. 3 is a diagram in which the stack memory unit 113 is partitioned into three areas and the number of generated threads is 5. Of the five generated threads, the first thread is allocated to the first stack area, the second thread is allocated to the second area, and the third thread is allocated to the third area.

The fourth and the fifth threads store the first and second stack areas as the allocated areas, respectively. However, since the first and second areas are already allocated other threads, the fourth and fifth threads are not allocated to the stack memory unit 113 but to respective virtual stack frames acquired in the virtual stack area of the main storage medium 103.

Thus, according to the present embodiment, in a state where a stack area and a stack frame are allocated each thread, the target thread or the target method to be executed is located in the stack memory unit 113 upon every thread switching as described below. Here, a thread is composed of a plurality of methods. Hereinafter, the stack memory unit 113 is partitioned into three areas and five threads are generated as shown in FIG. 3.

Figure 4:
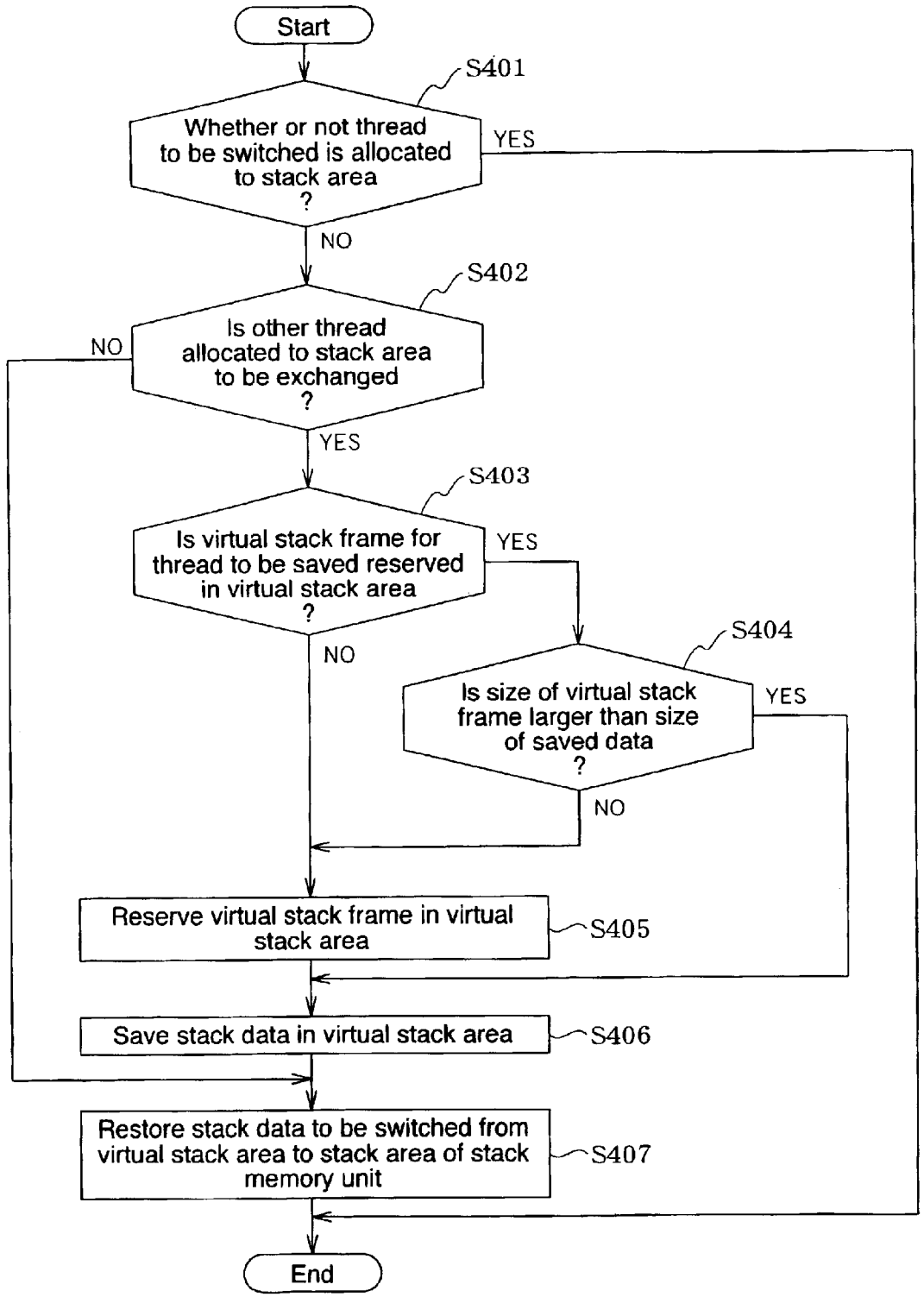
FIG. 4 is a flowchart showing an example of the method for use of a stack according to the embodiment of the invention.

First, as shown in the flowchart shown in FIG. 4, whether or not the fourth thread as a thread to be switched is allocated to the corresponding first stack area is judged (Step S401). If the thread to be switched is already allocated, there is no need of switching, thereby terminating the process. However, in the present case, the first thread is allocated to the first stack area and the fourth thread to be switched is not allocated thereto. Thus, the procedure proceeds to the following Step S402.

Figure 5A:
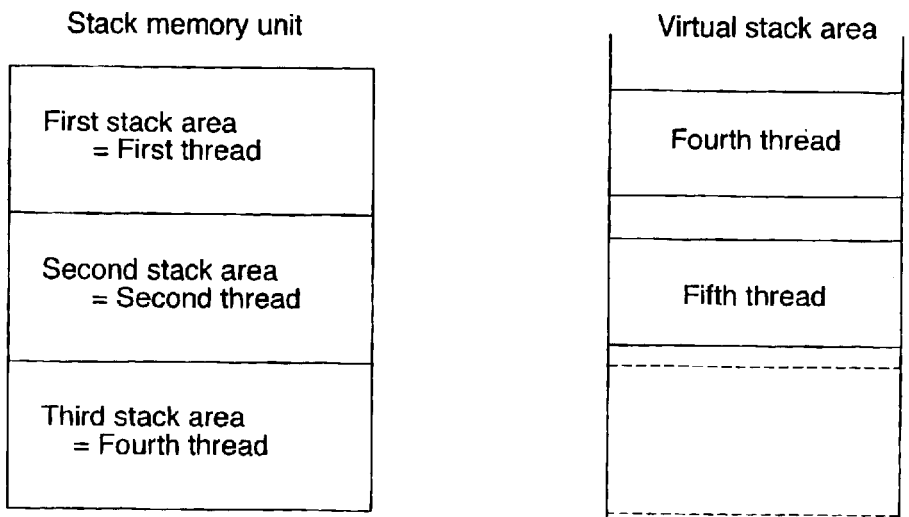
FIGS. 5a–5c are diagrams illustrating thread switching.

Next, whether or not other thread is allocated to the stack area to be exchanged, i.e., the first area, is judged (Step S402). As shown in FIG. 5A, since the first stack area is already allocated the first thread, that is, other thread is already allocated to the stack area to be exchanged, the procedure proceeds to Step S403. In Step S403, whether or not the virtual stack frame for the thread to be saved, i.e., the first thread, is reserved in the virtual stack area is judged.

As shown in FIG. 5A, no virtual stack frame for the first thread is present in the virtual stack area, and thus the procedure proceeds to Step S405 to reserve the virtual stack frame for the first thread in the virtual stack area. The address of the acquired virtual stack frame is stored in the corresponding thread (first thread). If a virtual stack frame for the thread to be saved is judged to be reserved in Step S403, the procedure proceeds to Step S404 to judge whether the size of the reserved virtual stack frame is larger than the data size of the corresponding thread (size of the saved data).

Figure 5B:
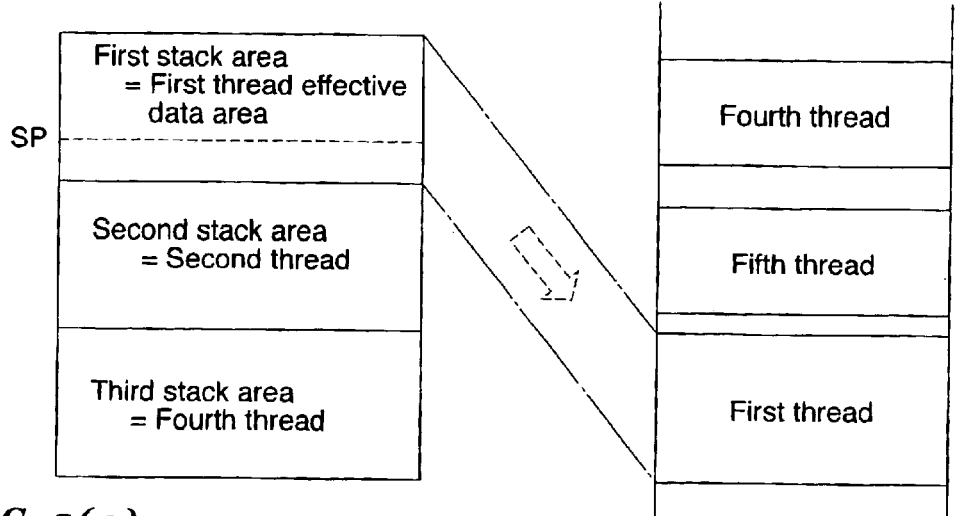
Figure 5C:
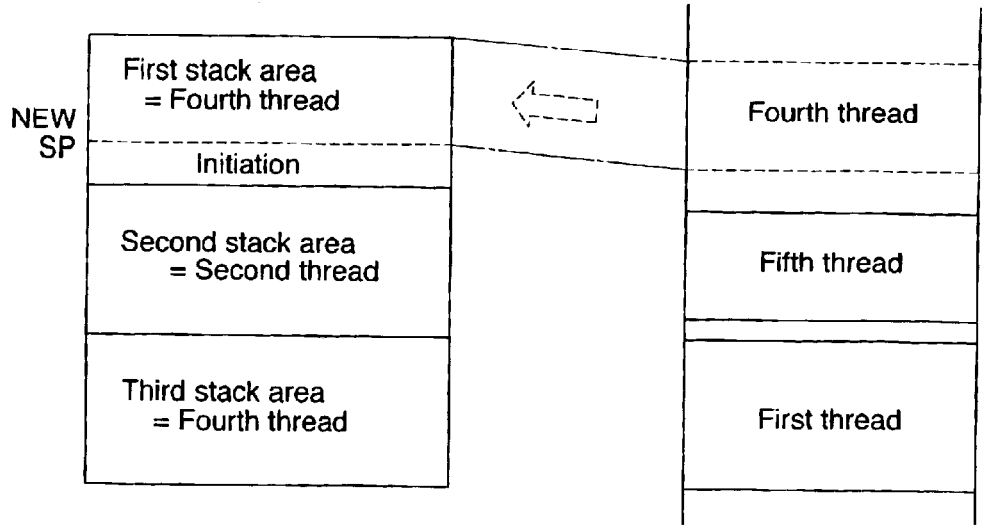

When the virtual stack frame is reserved and the size thereof is larger than the size of the saved data, the procedure proceeds to Step S406 where the first thread presently allocated to the first stack area to which the fourth thread belongs is saved in the virtual stack area. The size of the saved data corresponds to an effective stack data area beginning from the top of the stack data of the first thread (to position SP). As a result, the first stack area is defalcated as shown in FIG. 5B.

Thereafter, the data of the fourth thread as stack data to be switched is copied to the first stack area of the stack memory unit 113 by the controller unit 112 (accelerator device 101) (Step S407). An effective size of the fourth thread is copied from the virtual stack frame in the virtual stack area of the main storage medium 103. Furthermore, first stack area stores that the fourth thread is the currently allocated thread. The data of the first thread that is no longer the current thread is not saved until the fifth thread belonging to the same stack area becomes the current thread.

On the other hand, when there is no other thread being allocated to the exchanged stack area, i.e., the first stack area, in Step S402, the procedure proceeds to Step S407 to copy the data of the fourth thread as stack data to be switched to the first stack area of the stack memory unit 113.

Accordingly, the target thread to be executed (processed) is always present in the stack memory unit 113 of the accelerator device 101, and thus continually allowing access at high speed.

As described above, according to the present invention, the target thread to be processed is always present in the stack memory unit of the Java accelerator device. Therefore, various advantages such as enhancement of memory access speed and minimization of deterioration of processing speed can be achieved.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for use of a stack, the method comprising the steps of:

instructing a Java accelerator device to switch from a first thread allocated to a stack memory unit included in the Java accelerator device to a second thread;

allocating the first thread to a predetermined area of a main storage medium, which is arranged external to the Java accelerator device;

determining whether the predetermined area is capable of completely storing the first thread;

if the predetermined are is determined to be capable of completely storing the first thread, storing the first thread in the predetermined area;

if the predetermined area is determined to be not capable of completely storing the first thread, allocating the first thread instead to a second area of the main storage medium and storing the first thread in the second area; and instructing the Java accelerator device to allocate the second thread to the stack memory unit before executing the second thread.

2. The method for use of a stack according to claim 1, wherein the stack memory unit is equally partitioned into a plurality of stack frames to which threads are allocated.

3. The method for use of a stack according to claim 2, wherein a thread that cannot be allocated to any of the plurality of stack frames of the stack memory unit is allocated to a virtual stack frame formed in the main storage medium.

4. The method for use of a stack according to claim 1, wherein the main storage medium is a hard disk.

5. The method for use of a stack according to claim 2, wherein the main storage medium is a hard disk.

6. The method for use of a stack according to claim 3, wherein the main storage medium is a hard disk.

* * * * *